Feb. 28, 1967
E. B. BERNSON
3,306,631
METHOD AND APPARATUS FOR FORMING A TWO-PLY COMPOSITE
MATERIAL WITH A PROFILED FACE AND
A PRODUCT MADE THEREWITH
Filed July 2, 1965
2 Sheets-Sheet 1
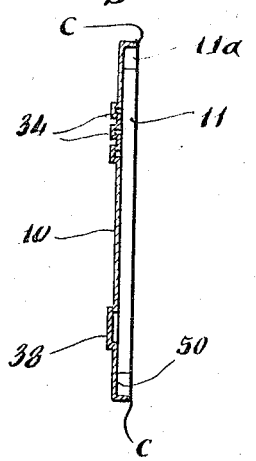
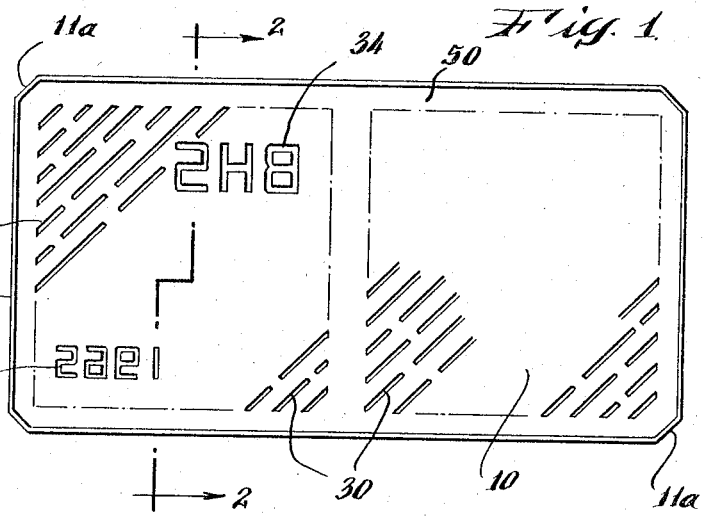
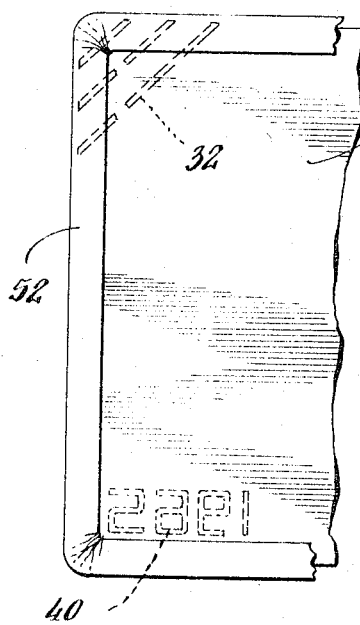
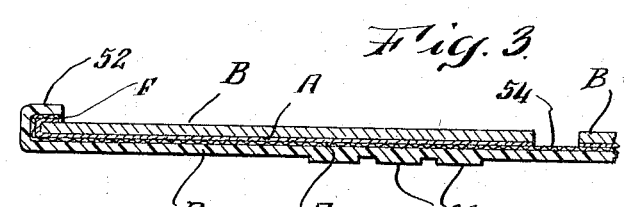
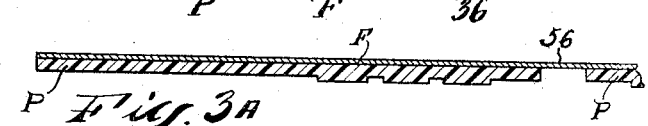
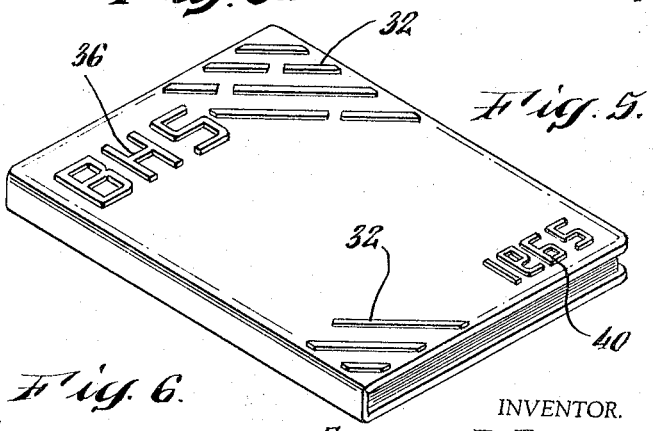
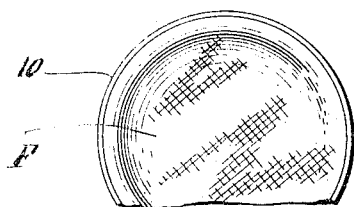
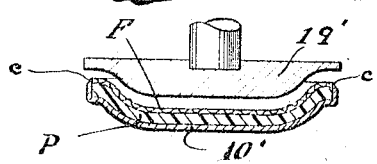
INVENTOR.
Eugene B. Bernson
BY
John W. Hoag
ATTORNEY.

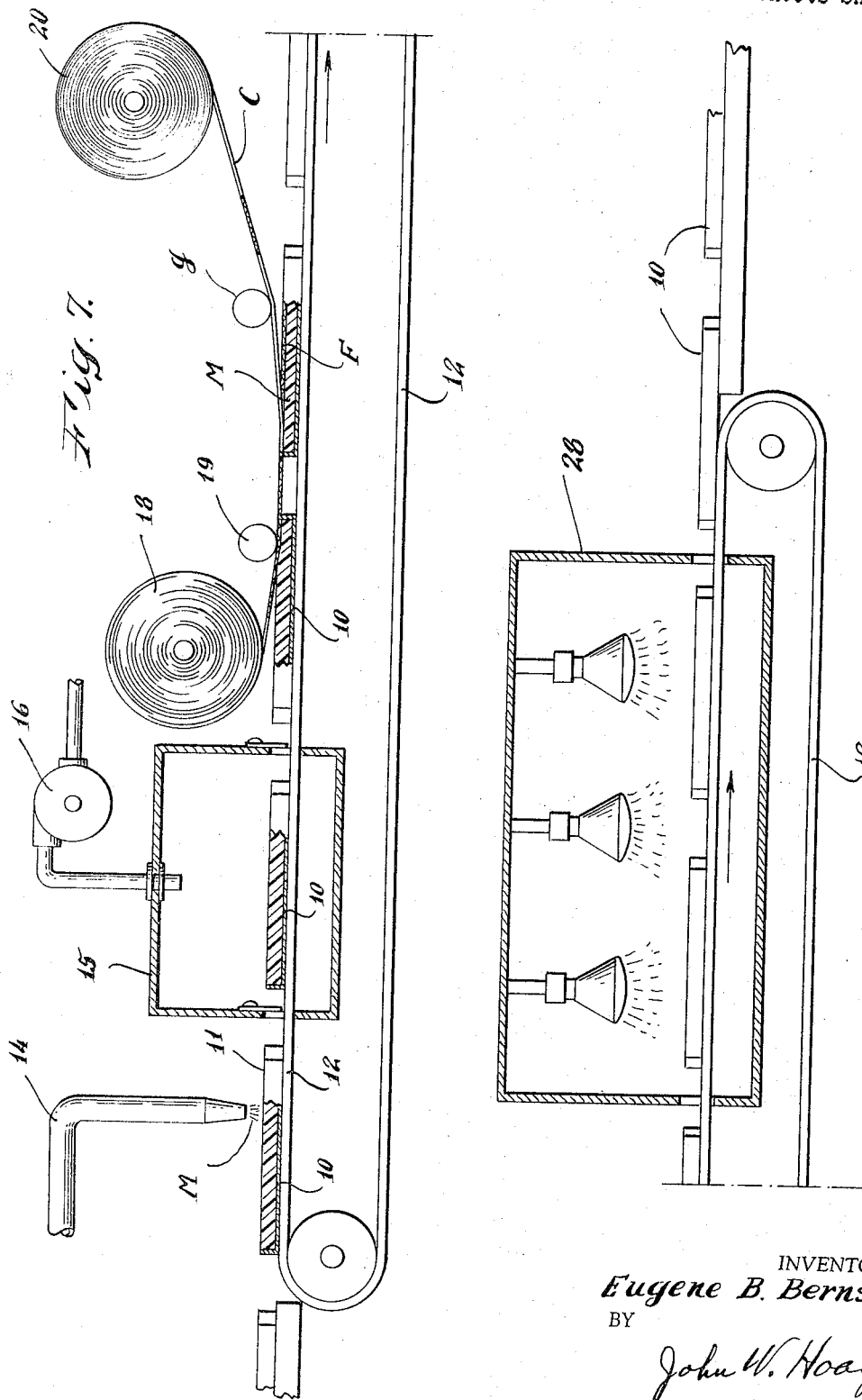

United States Patent Office 3,306,631
Patented Feb. 28, 1967

3,306,631
METHOD AND APPARATUS FOR FORMING A TWO-PLY COMPOSITE MATERIAL WITH A PROFILED FACE AND A PRODUCT MADE THEREWITH
Eugene B. Bernson, 10 East Ave., Norwalk, Conn. 06851
Filed July 2, 1965, Ser. No. 469,169
6 Claims. (Cl. 281—29)

This invention relates to method and apparatus for forming a two-layer composite material of plastic and a facing material, and more particularly to the method of making such material with a surface which may be decorated, to have a "grained" or "pebbled" appearance if desired, and have a profile simulating an embossed surface, and to book covers made with said material.

In the manufacture of embossed book covers, such as are used for school and college class books for example, a piece of leather or of paper or cloth which may have been impregnated with resin, are wrapped around a strengthening member such as a piece of cardboard. Previously however, whether the cardboard was assembled with a resin impregnated fabric or with distinct laminations of plastic, the assembly has been placed in a press and embossed to provide raised indicia on the cover such as "Class of 1965." The embossing step raises portions of the outer surface of the cover to provide the desired indicia and forms corresponding depressions or concavities in its inner surface. The presence of these depressions on the inner surface of the cover is objectionable, for, unless they are covered by adding an inner facing over the inside of the cover, portions of the pages of the book, especially the first pages, get pressed into the concavities thus deforming the pages.

In the prior art, if a cover with a graining, pebbling or ribbing design was desired this was done by pressing on the outer surface of the cover, except the portions to be embossed, with a graining die. An area in which the embossing was to the done was left smooth. The area to be embossed was blanked out of the graining pattern and in a second step it was embossed.

An object of the invention is to eliminate the separate prior art steps of "graining" or "pebbling" or "ribbing" of the outer surface of the book cover, and of embossing.

Another object of the invention is to eliminate embossing and provide a book cover the outer surface of which has the desired profile and the inner surface of which is smooth, without countersunk portions.

Another object of the invention is to simplify the formation of book covers.

Another object of the invention is to eliminate waste of materials in the formation of book covers.

Another object of the invention is to provide a simplified way of forming a two-ply material comprising a layer of plastic and a layer of facing material such as paper or cloth employing a combination casting mold and cutting die as part of the process.

Another object of the invention is to cast a plastic lamination and cause a length of facing material to adhere to it in superimposed position and simultaneously trim the facing material to correspond with the size and surface shape of the casting.

The invention will best be understood by reading the following description in connection with the drawings, in which:

FIGURE 1 is a plan view of a mold into which resin in liquid state may be poured and cast with a desired profile, FIGURE 2 is a sectional view taken on lines 2—2 of FIGURE 1, FIGURE 3 is a longitudinal sectional view partly cut away of a bookcover comprising, a binderboard and a two-ply composition material including an outer lamination of plastic cast in the mold shown in FIGURE 1, covered on its rear surface by a piece of cloth, with the margins of the composite cast plastic and cloth laminations extending over the front surface of the binderboard and around the edges of the binderboard, FIG. 3a is a similar view of a modified bookcover, FIGURE 4 is a rear view of a portion of the cover shown in FIGURE 3, FIGURE 5 is a perspective view of a book, such as a school class book, having a cover of the kind disclosed herein, FIGURE 6 is a plan view, and FIGURE 6a is a sectional view showing another form of mold, and another pressure member, and FIGURE 7 is a schematic view illustrating a simple, waste saving way of making composite material of the kind disclosed herein in connection with the making of book covers.

As shown in FIGURE 7 a series of open top molds 10 are being advanced by endless conveyer means 12 under the supply conduit 14, from which a measured amount of casting material M in liquid state, such as a vinyl chloride or polyvinyl chloride resin prepared in the form of a viscous syrup, may be delivered into each mold successively. The top c of the sidewalls 11 of the molds are cutting edges.

Next the molds are passed through a chamber 15 in which the pressure is reduced, as by evacuating apparatus of known kind indicated generally by the numeral 16, to cause air bubbles trapped with the casting material M to escape.

The molds are then covered with a length of facing material C, preferably cloth or paper, unrolled from roll 18 and rerolled on roll 20 after passing under guide roll g, in timed relation to the speed of travel of the molds. The length of facing material is held down and smoothed out over the molds and the casting material M therein by the roller 19 which also presses the cloth down on the cutting edges c of the mold walls 11 and coacts with the cutting edges of the mold walls to cut out from the facing material C pieces F of facing material equal in size to the inside perimeter of the mold and lying on top of the casting material in the mold.

The molds are then treated to harden the casting material within the molds, thereby forming a two-ply composite material comprising a lamination P of cast plastic, the smooth surface of which is fused to the superimposed cloth facing F. The nature of the treatment for hardening the casting composition will depend upon the casting material selected. For the purpose of illustration it is assumed in FIGURE 7 that the plastic is one which is hardened by heating, as for example vinyl chloride or polyvinyl chloride resin prepared in liquid state, and that the casting step is performed by passing the molds through the oven 28 which is heated to a temperature suitable for setting the resin and fusing it to the facing material, taking into account the particular resin employed, the length of the oven, the speed of travel of the molds, and the thickness of the plastic. After leaving oven 28 the composite material comprising the laminations P and F may be removed from the molds in any convenient way as for example by hand.

It will be understood that many plastic compositions which may be used may be hardened at room temperature or by cooling and therefore treatment in a heating oven may be eliminated.

If the composite material is to be used to form a bookcover molds 10 are shaped to cast a lamination P with the profile desired for the cover. In FIGURE 1 for example a mold 10 is shown comprising the series of concavities 30 for forming ribs 32 on the casting such as are illustrated in FIGURE 5. Other concavities 34 are shown for forming the letters B, H and S identified by numeral 36 as shown in FIGURE 5, and concavities 38 are provided for forming the raised numerals 40, shown in FIGURE 5, which in the illustrated example indicate the year 1965.

In FIGURE 1 the mold 10 is shown substantially rectangular to form a length of material exactly of the size for covering a single book. The mold shown in FIGURE 1 has a marginal portion 50 to form a flexible casting P with a marginal portion 52 adapted to be turned, together with a marginal portion of its facing F, over the edges of a piece of binderboard B.

It will be noted that the wall 11 (FIGURE 1) around the perimeter of the mold comprises the portions 11a which are disposed at an angle of 45° with respect to the adjoining side wall portions to provide a flexible casting the margin of which can be conveniently bent over the corners of a stiffening board. It will be understood that if a stiffening board is not used, a mold with side walls meeting at an angle of 90° for forming a rigid casting, may be preferred.

It will be understood from the preceding description that the invention is not limited to the use of any particular casting material and contemplates a cast plastic lamination which may be flexible or rigid. A suitable plastic may be selected from known materials according to the appearance, thickness and flexibility desired. The molding material used may be in liquid state, or in the form of sheets, pellets or powder, and may include thermosetting as well as thermoplastic resins, and the shaping and hardeneing steps employed will be appropriate to the molding material. It will be understood that the steps and means shown in FIGURE 7 are merely illustrative of one set of steps which would be appropriate if the selected molding material is one which is prepared in the form of a viscous syrup and can be poured into an open mold and hardened by heating.

The facing material may be cloth, paper and the like, adapted to receive a coating A of adhesive by which the composite material may be securely bound to a binderboard, if one is used, and to the spine of the pages being bound, but is preferably woven cloth the interstices of which have been closed as with sizing so that the two layers of the composite material remain distinct although firmly adhered to one another.

In FIGURE 6a the mold is adapted to cast a product with a curving surface. The pressure member 19' serves both to complete the mold and to coact with the cutting edges c of mold part 10'. It will be understood that member 19' may desirably be reciprocated vertically in timed relation to a step by step advance of a conveyor on which mold parts 10' are supported. Member 19' will descend to register with a mold part 10' after it is covered with a length of facing material C, to provide a top for 10' and simultaneously shape the plastic material between itself and 10' and coact with the cutting edge c of the mold part 10' in cutting the desired piece F of facing material from the strip C.

For a flexible cover, when the cast plastic is to be wrapped over the edges of a lamination of binderboard, a thin lamination, on the order of .020 of an inch, may be cast, or molded in any suitable way for example from polyvinyl chloride. In this embodiment of the invention the binderboard may comprise two parts B and B, FIGURE 3, separated at the transverse midline and interconnected by the composite material, the fabric facing portion 54 of which constitutes a glue strip which may be glued to the rear edge of the individual pages being bound.

A thicker, non-flexible lamination may be preferred and the lamination of binderboard eliminated. The plastic lamination may be cast in two parts interconnected by the facing material which forms the spine 56 of the cover, FIGURE 3a, and may be glued to the rear edges of the individual pages thus providing a hinge at the back of a book employing the casting.

The facing of cloth or paper on the smooth surface of the casting facilitates securing the composite material to a lamination of binderboard, or directly to the assembly comprising the pages of the book, and this may be accomplished in known ways, as for example by pasting the front and last pages to the inside surfaces of the cover or as by "perfect" binding where the rear edges of the individual sheets of the book are glued to the spine of the cover as described above.

There has thus been provided method, apparatus and product by which the above stated objects are accomplished in a thoroughly practical way.

What I claim is:

1. The method of making a composite material comprising a flexible thickness of plastic and a layer of cloth which comprises, supplying a charge of resin to be cast into an uncovered mold, covering the mold with a layer of cloth, bringing the mold with the resin therein, and with the cloth stretched out over the mold and the resin therein, into contact with a pressure member, utilizing the edges of the mold as cutting edges to trim the cloth to the shape and size of the mold while pressing the cloth onto the surface of the plastic within the mold, and hardening the layer of resin within the mold while the layer of cloth is in contact with one surface of the layer of resin.

2. The method of forming two-ply, plastic and cloth composite material of predetermined size and thickness, which comprises, using a flat open top mold with side walls substantially equal in height to the thickness desired for the composite material and having cutting edges, filling the mold with plastic substantially to the top of the side walls, superimposing a length of cloth over the plastic within the mold and over its cutting edges, applying pressure on top of the cloth to smooth it and cause it to contact the surface of the plastic within the mold, and to coact with the cutting edges of the mold in dieing out the cloth to the size of the perimeter of the inside of the mold, and hardening the plastic thereby causing it to adhere to the superimposed, trimmed cloth.

3. The method of forming a book cover which comprises, providing an open top mold for casting plastic, with the bottom of the mold being preformed with concavities to provide castings having raised indicia and with the mold side walls being of a height substantially equal to the thickness desired for the book cover and being characterized by top cutting edges, covering the mold with a length of facing material after it has been filled with plastic to be cast, exerting pressure to press the facing material onto the surface of the plastic material within the mold and simultaneously against the cutting edges of the mold walls to die out a lamination equal in extent to the opposed surface of the material within the mold, and hardening the casting within the mold to give it form and shape and at the same time to fuse the facing to one surface of the casting, removing from the mold the two-ply composite material thus provided, securing a piece of binderboard to the facing of the two-ply composite material, and bending the margins of the composite material around the edges of the piece of cardboard and securing them onto the rear surface of the piece of cardboard with the bent over margins of the facing in contact with the rear surface of the cardboard.

4. The method of forming a boook cover, which comprises, charging an open top mold the edges of which are cutting edges with a charge of material to be cast, covering the mold with a piece of facing material, smoothing the upper surface of the casting material within the mold and pressing the facing material against said surface and against the mold edges, and cutting the fabric around the perimeter of the casting material, and hardening the casting materials with the facing material superimposed thereon, 5. A book cover comprising, a lamination of cast plastic having a smooth rear face and a lamination of facing material extending over the smooth rear face of the casting, and a lamination of board, the lamination of facing material being between the cast plastic and board laminations, the margin of the laminations of facing material and of cast plastic being turned over the edges of the board and secured to the rear face of the board with the margins of the facing material being disposed between the rear surface of the board and the margins of the cast plastic.

6. The method of forming a composite material which comprises, providing an open top mold for casting plastic with the mold side walls being cutting edges, covering the mold with a length of facing material after the plastic material to be cast has been supplied into the mold, exerting pressure to press the facing material onto the surface of the plastic material within the mold and against the cutting edges of the mold walls to die out a lamination of facing material equal in extent to the opposed surface of the plastic material within the mold, and hardening the casting to set the form and shape and at the same time to fuse the facing to one surface of the casting.

References Cited by the Examiner
UNITED STATES PATENTS

| | | | |
|---|---|---|---|
| 2,177,879 | 10/1939 | Schade | 281—29 |
| 2,339,586 | 1/1944 | Roberts | 281—29 |
| 2,631,646 | 3/1953 | Gannon | 156—500 X |
| 2,646,380 | 7/1953 | Barlow et al. | 156—245 X |
| 2,759,517 | 8/1956 | Marco | 156—201 |
| 2,788,051 | 4/1957 | Tuttle | 156—201 |
| 3,088,753 | 5/1963 | Sendor | 281—29 |
| 3,161,423 | 12/1964 | Hertzberg | 281—29 |
| 3,168,424 | 2/1965 | Sendor | 156—500 X |

LAWRENCE CHARLES, *Primary Examiner.*